US006503468B1

(12) United States Patent
Sandifer et al.

(10) Patent No.: US 6,503,468 B1
(45) Date of Patent: Jan. 7, 2003

(54) METHOD OF PREPARING SILVER-DOPED VANADIUM PENTOXIDE ANTISTATIC AGENT

(75) Inventors: James R. Sandifer, Rochester, NY (US); David S. Uerz, Ontario, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 10/042,617

(22) Filed: Jan. 9, 2002

(51) Int. Cl.[7] ............................................... C01G 31/02
(52) U.S. Cl. ........................ 423/62; 423/23; 252/500; 252/514; 252/518.1; 252/520.3; 252/520.4; 428/662; 106/451; 106/479; 516/97
(58) Field of Search .................. 252/500, 514, 252/518.1, 520.2, 520.3, 520.4; 423/62, 23; 428/662; 106/451, 479; 516/97

(56) References Cited

U.S. PATENT DOCUMENTS

| 4,203,769 A | 5/1980 | Guestaux |
| 5,455,153 A | 10/1995 | Gardner |
| 5,654,089 A | 8/1997 | Gardner |
| 5,709,985 A | 1/1998 | Morrison et al. |
| 6,010,836 A | 1/2000 | Eichorst et al. |
| 6,013,427 A | 1/2000 | Eichorst et al. |

OTHER PUBLICATIONS

Coustier et al, "Doped Vanadium Oxides as Host materials for Lithium Intercalation,", J. Electrochemical Soc., 146(4), 1355–1360, (1999).*
Coustier et al, "Dip Coated silver–doped V2O5 xerogels as host materials for lithium intercalation," Solid State Ionics, 100, 247–258, (1997).*
F. Coustier, S. Passerini, W.H. Smyrl, "Dip–Coated silver–doped $V_2O_5$ xerogels as host materials for lithium intercalation", May 5, 1997, 247–258.
J. Livage, "Vanadium Pentoxide Gels", 1991, 3, 578–593.
F. Coustier, J. Hill, B. Owens, S. Passerini, W.H. Smyrl, "Doped Vanadium Oxides as Host Materials for Lithium Intercalation", 1998, 1335–1360.

* cited by examiner

*Primary Examiner*—Mark Kopec
*Assistant Examiner*—Kallambella Vijayakumar
(74) *Attorney, Agent, or Firm*—Doreen M. Wells

(57) ABSTRACT

A method of doping vanadium pentoxide with silver comprising the steps of: providing vanadium pentoxide gel providing stable colloidal silver and combining the vanadium pentoxide gel and the colloidal silver at room temperature for a period sufficient for vanadium (+5) to be electrochemically reduced to vanadium (+4) and for silver to be oxidized (+1).

6 Claims, 1 Drawing Sheet

METHOD OF PREPARING SILVER-DOPED VANADIUM PENTOXIDE ANTISTATIC AGENT

FIELD OF THE INVENTION

The invention concerns silver-doped vanadium pentoxide antistatic agents in general, and in particular, a method for preparing the antistatic agent at room temperature and recovering a product with minimal precipitates.

BACKGROUND OF THE INVENTION

The preparation and use of vanadium pentoxide is of interest in the manufacture of radiation sensitive elements in general and to the photographic industry in particular. For example, U.S. Pat. No. 4,203,769 describes the preparation of a material suitable for use as an antistat in radiation-sensitive elements in general and photographic products in particular. The preparation involves forming a melt comprised of at least 80% by weight of vanadium pentoxide and casting the melt into a solubilizing amount of water. The resultant product may be euphemistically referred to as "Vanadium Oxide", "gelled (or hydrated) Vanadium Oxide", "colloidal vanadium oxide" or $V_2O_5$ (the chemical composition of divanadium pentoxide) but, in truth, the precise composition is unknown. It has the physical form of microscopic fibers that have been referred to as "living polymers" because their compositions and properties have been observed to change with time. This preparation will herein be referred to as the "melt-quenched" preparation.

In U.S. Pat. Nos. 5,455,153 and 5,654,089, Gardner describes the use of various polyester resins to "protect" vanadium pentoxide fibers prepared using the "melt-quenched" method. Gardner claims the cladding of $V_2O_5$ doped with silver wherein the silver doping is achieved by including silver oxide ($Ag_2O$) in the original melt. The described process for doping is a high temperature process that produces a metastable product of unknown composition, but with antistat properties that are important in the manufacture of photographic products. The antistat properties were observed to vary with the level of silver doping. The process results in the production of undesirable particulate matter as a by-product that must be subsequently removed. This method of preparing melt-quenched, silver doped, vanadium oxide colloidal gels will herein be referred to as the "melt-quenched, silver doped, vanadium oxide preparation.

Coustier, Passerini, and Smyrl (see, F. Coustier, S. Passerini, and W. H. Smyrl, "Dip-Coated Silver-Doped $V_2O_5$ Xerogels as Host Materials for Lithium Intercalation," *Solid State Ionics*, 100 (1997) 247–258) and Coustier, Hill, Owens, Passerini, and Smyrl (See, Fabric Coustier, Jason Hill, Boone B. Owens, Stefano Passerini, and William H. Smyrl, "Doped Vanadium Oxides as Host Materials for Lithium Intercalation," *Journal of The Electrochemical Society*, 146(1999)1355–1360) disclose a method for doping colloidal vanadium oxide gel using a low temperature technique. Vanadium oxide colloid is initially prepared by a "sol-gel" technique that has been described by Livage, in a review of colloidal vanadium oxide gels (See, Livage, "Vanadium Pentoxide Gels," *Chem Mater.*, 3(1991) 578–593.

Livage's review covers both the high temperature "melt-quenched" preparations as well as the "sol-gel" technique. The "sol-gel" technique has been described as the "protonation of sodium metavanadate solution". The prior art teaches that properties desirable for use as cathodes in batteries can be achieved by metallic silver doping of "sol-gel" prepared colloidal vanadium oxide gels.

The art does not suggest nor give incentive to believe that whatever gel is prepared using the "sol-gel" technique would have the same desirable properties (for example, those required in photography) as gels prepared using the high temperature "melt-quenched" preparation method. In fact, the two techniques don't even begin with the same starting materials—sodium metavanadate in one case, vanadium pentoxide in the other. Furthermore, the doping of vanadium pentoxide, as studied in the two Coustier references above, is for an application totally different from photography or imaging; and therefore Coustier et al. might wish to achieve totally different properties. Coustier et al. was interested in producing a material suitable for use as cathodes in high-capacity lithium batteries. That method would not predictably produce an antistat material suitable for use in photographic/imaging elements.

Hence, it remains uncertain to one skilled in the art what properties would result from doping the analogous "melt-quenched" vanadium oxide gel material with metallic silver at low temperatures. No prior art teaches, or even predicts, that properties desirable for use as antistat materials in photographic elements would be achieved by metallic silver doping of "melt-quenched" colloidal vanadium oxide gels at any temperature. Neither does the prior art teach or suggest that the material prepared using the sol gel prepared starting material for cathodes in high-capacity lithium batteries would be suitable as an antistat in the imaging arts.

In making antistat materials, three improvements would be desirable: 1.) A room temperature technique for silver doping is desired that would provide a stable product of known composition; 2.) The silver/vanadium ratio should be adjustable to meet the requirements for particular applications; and 3.) The final product should be free of particulate matter. The resultant product should be useful as antistat material in photographic or imaging elements as described in U.S. Pat. Nos. 5,709,985; 6,010,836; and 6,013,427.

It would be useful in the technology to have a method of doping "melt-quenched" colloidal vanadium gel with colloidal silver at room temperature to produce an antistat useful in the imaging arts.

SUMMARY OF THE INVENTION

The present invention discloses a method of doping "melt-quenched" colloidal vanadium gel with colloidal silver. Unexpectedly, the method yields a product that is stable, adjustable, and free from particulate matter.

The present invention discloses: A method of doping vanadium pentoxide with silver comprising the steps of:

a. providing vanadium pentoxide gel;
    b. providing stable colloidal silver; and
    c. combining the vanadium pentoxide gel and the colloidal silver at room temperature for a period sufficient for vanadium (+5) to be electrochemically reduced to vanadium (+4) and for silver to be oxidized (+1).

DETAILED DESCRIPTION OF THE INVENTION

Figure 1:
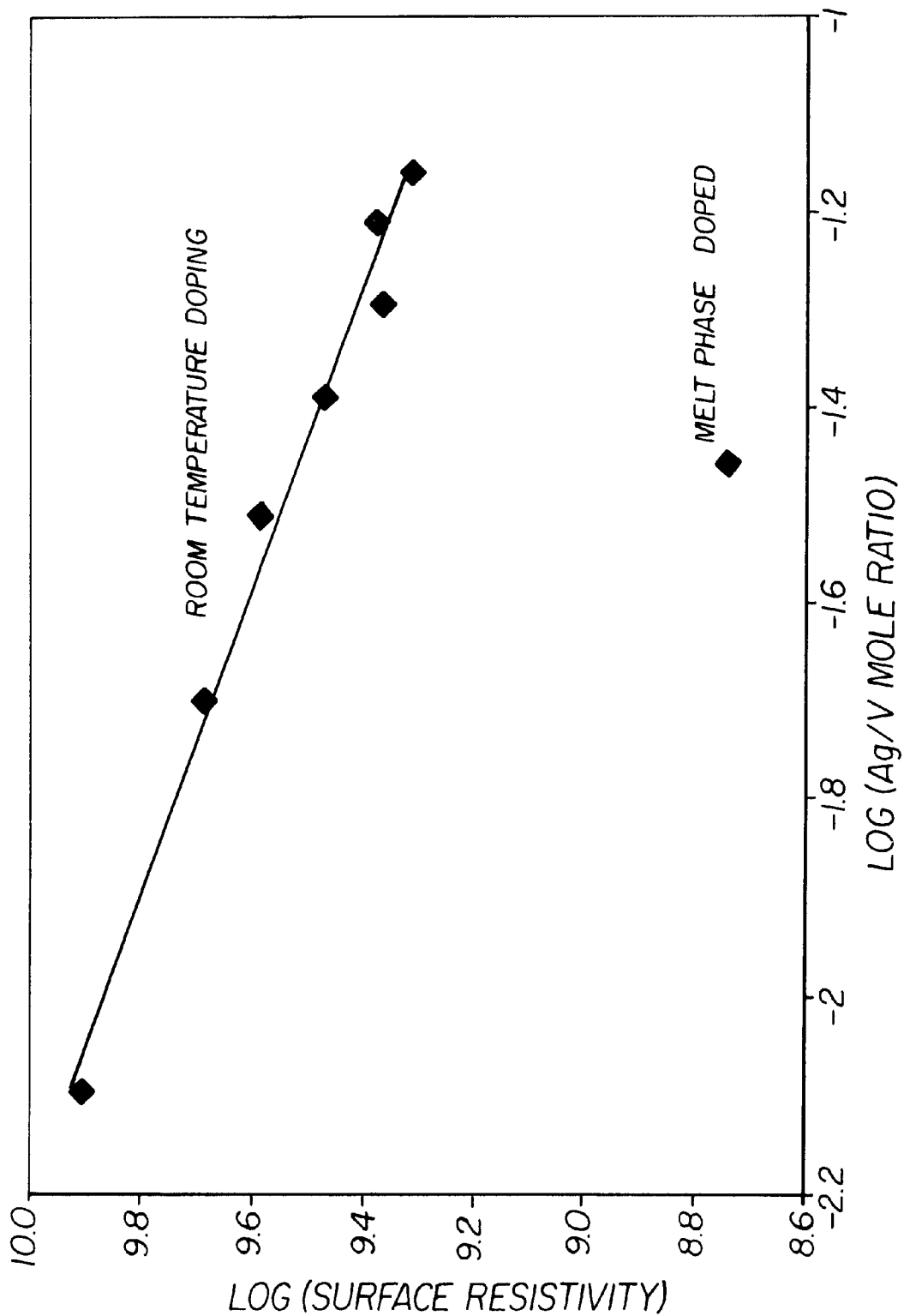
FIG. 1 shows the relationship between surface resistivity and silver to vanadium ratio.

Three advantages accrue from the invention. Antistat materials can be doped at room temperature, composition can be precisely adjusted by controlled doping, and coating solutions prepared from the antistat materials are less prone to the formation of undesirable precipitates than with doped vanadium oxide gels that have been prepared by the "melt-quenched, silver doped vanadium oxide" technique—that is, the high temperature method of U.S. Pat. Nos. 5,455,153 and 5,654,089 discussed above.

Further, by adjusting the amount of colloidal silver added in the doping step, the surface resistivity of the resulting coatings can be varied in a linear manner.

The following examples demonstrate the invention.

EXAMPLES:

When "melt-quenched" vanadium oxide gels are reacted with colloidal silver at room temperature the resultant product is visibly clear (without precipitates) and has adjustable composition with respect to silver/vanadium oxide ratio.

Preparation of Stock Solutions

18 M$\Omega$ (high purity) water was used to prepare solutions.

A 0.285% solids "Melt-Quenched" Vanadium Oxide stock solution (MQVO) was prepared by dilution of "melt-quenched" vanadium oxide gel manufactured according to the method described in U.S. Pat. No. 6,013,427.

A 0.05% (w/w) stock solution of colloidal silver was prepared by dissolving 0.2541 g Mild Silver Protein (19% silver) (Aldrich #29,824,7) in 100 mls of high purity water.

A 0.285% solids Silver Doped "Melt-Quenched" Vanadium Oxide stock solution (AgMQVO) was prepared by dilution of "melt-quenched" silver doped vanadium oxide gel manufactured according to the method described in U.S. Pat. No. 6,013,427.

Preparation of Coating Solutions

Aqueous antistat coating solutions comprised of silver protein stock solution, colloidal vanadium oxide stock solution (AgMQVO or MQVO), water, Olin 10G surfactant and a coating aid (a terpolymer latex of acrylonitrile, vinylidene chloride and acrylic acid) were prepared according to Table 1. In each case, the appropriate amount of silver protein stock solution was pipetted directly into a magnetically stirred, room temperature mixture of the remaining components.

TABLE 1

Coating Solutions

| Solution # | Colloidal Ag (mls) | MQVO (grams) | HP H2O (grams) | AgMQVO (grams) |
|---|---|---|---|---|
| 1 | 0 | 0 | 769.65 | 28.01 |
| 2 | 0 | 28.03 | 769.60 | 0 |
| 3 | 2 | 28.01 | 767.62 | 0 |
| 4 | 4 | 28.02 | 765.60 | 0 |
| 5 | 6 | 28.03 | 763.60 | 0 |
| 6 | 8 | 28.03 | 761.64 | 0 |
| 7 | 10 | 28.03 | 759.63 | 0 |
| 8 | 12 | 28.01 | 757.61 | 0 |
| 9 | 14 | 28.03 | 755.62 | 0 |

All solutions contained 1.97 g of a 10% solution of Olin 10 G surfactant and 0.46 g of a 30% solids coating aid solution consisting of a terpolymer latex of acrylonitrile, vinylidene chloride, and acrylic acid.

Coating Solution Clarity

Twenty-four hours after the coating solutions were prepared they were visibly inspected for color and particulate matter. Visual inspection of the solutions after five minutes indicated that reduction of the vanadium had already begun, due to color shift from brown to green. Solutions were again observed after 24 hours to confirm stability—that is, color, clarity, and the absence of particulate matter. As shown in Table 2, the solutions retained their color and clarity and remained and free of particulate matter. Observations made weeks later further confirmed stability. One skilled in the art would expect that the reaction time (for reduction) would be affected by the particle size of the silver in the colloid and by the temperature of the reaction mixture.

TABLE 2

Color and Particulates

| Solution # | Color | Clear | Particulate Matter |
|---|---|---|---|
| 1 | light brown | No | Yes |
| 2 | light green | Yes | No |
| 3 | light green | Yes | No |
| 4 | light green | Yes | No |
| 5 | light green | Yes | No |
| 6 | light green | Yes | No |
| 7 | light green | Yes | No |
| 8 | light green | Yes | No |
| 9 | light green | Yes | No |

Comparison (Solution #1) showed particulate matter after 5 mins. Invention did not.

Coating Solution Analysis

Aliquots of each coating solution were submitted for inductively coupled plasma atomic emission spectroscopy (ICP-AES) analysis for silver and vanadium. The samples were prepared by digestion with a mixture of sulfuric and nitric acids.

TABLE 3

Solution Analysis

| Solution # | Silver (ug/g) | Moles Ag | Vanadium (ug/g) | Moles V | Ag/V Mole Ratio |
|---|---|---|---|---|---|
| 1 | 3 | 2.781E−08 | 41 | 8.055E−07 | 0.035 |
| 2 | 0 | 0.000E+00 | 51 | 1.002E−06 | 0.000 |
| 3 | 0.91 | 8.436E−09 | 51 | 1.002E−06 | 0.008 |
| 4 | 2.2 | 2.039E−08 | 51 | 1.002E−06 | 0.020 |

TABLE 3-continued

Solution Analysis

| Solution # | Silver (ug/g) | Moles Ag | Vanadium (ug/g) | Moles V | Ag/V Mole Ratio |
|---|---|---|---|---|---|
| 5 | 3.4 | 3.152E−08 | 52 | 1.022E−06 | 0.031 |
| 6 | 4.4 | 4.079E−08 | 51 | 1.002E−06 | 0.041 |
| 7 | 5.4 | 5.006E−08 | 50 | 9.823E−07 | 0.051 |
| 8 | 6.7 | 6.211E−08 | 51 | 1.002E−06 | 0.062 |
| 9 | * | * | * | * | * |

* Data not available due to analysis problems.

Preparation of Antistat Layers

Solutions were mixed at room temperature for 2 hours and then machine coated, at 1.5 cc/ft$^2$, onto a polyethylene terephthalate film support that had been previously subbed with a terpolymer latex of acrylonitrile, vinylidene chloride and acrylic acid. The coatings were dried at 250 degrees F. Theoretical surface coverages were 0.26, 0.15 and 0.37 mg/ft$^2$ for the coating aid, vanadium oxide, and surfactant, respectively.

Surface Resistivity Measurements

The surface resistivity of each coating was measured using a Trek Inc., Model 152-CE Surface Resistance Meter together with a Trek Model 152P-CR Concentric Ring Surface Resistivity Probe. All measurements were made on 12" long samples that were cut from the lengthwise center of the individual coating rolls.

TABLE 4

Surface Resistivity Measurements

| Sol # | Doping Method | SER 9/12/00 | Ag/V Mole Ratio |
|---|---|---|---|
| 1 | AgMQVO | 5.45E+08 | 0.035 |
| 2 | RTD | 5.25E+09 | 0.000 |
| 3 | RTD | 8.15E+09 | 0.008 |
| 4 | RTD | 4.86E+09 | 0.020 |
| 5 | RTD | 3.86E+09 | 0.031 |
| 6 | RTD | 2.95E+09 | 0.041 |
| 7 | RTD | 2.34E+09 | 0.051 |
| 8 | RTD | 2.38E+09 | 0.062 |
| 9 | RTD | 2.06E+09 | * |

*data not available due analysis problems
AgMQVO = "melt quenched vanadium oxide," silver doped
RTD = "room temperature doped" (method of invention)

FIG. 1 shows that a linear relationship exists between the logarithm of the surface resistivities of the coatings prepared from the room temperature doped solutions and the logarithm of the ratio of silver to vanadium ratio found in these solutions. This relationship shows that a room temperature process can be used to adjust the conductivites of these coatings (their most important property) using solutions that are free of particulate matter.

TABLE 1

Relationship Between Surface Resistivity and Silver to Vanadium ratio.

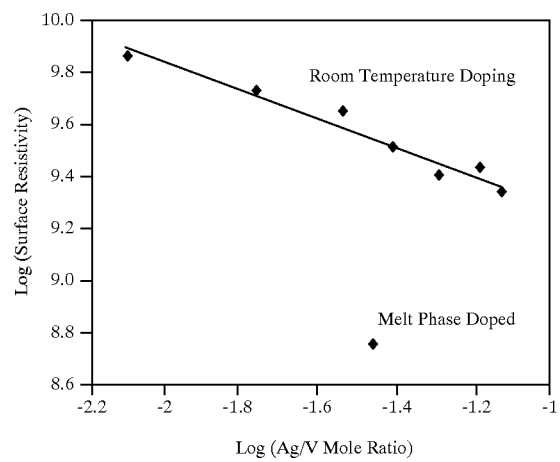

What is claimed is:

1. A method for doping vanadium pentoxide with silver comprising the steps of:

a) providing vanadium pentoxide gel;

b) providing stable colloidal silver; and c) combining the vanadium pentoxide gel and the colloidal silver at room temperature for vanadium (+5) to be electrochemically reduced to vanadium (+4) and for silver to be oxidized to (+1).

2. The method of claim 1 wherein the electrochemical reduction occurs within 24 hours.

3. The method of claim 1 wherein the electrochemical reduction occurs within 5 minutes.

4. The method of claim 1 wherein the mole ratio of silver to vanadium is between 0.008 and 0.07.

5. The method of claim 1 wherein the silver doped vanadium pentoxide is visually clear.

6. The method of claim 1 wherein the silver doped vanadium pentoxide is visually free of particulate matter.

* * * * *